(12) United States Patent
Morini et al.

(10) Patent No.: US 8,062,989 B2
(45) Date of Patent: Nov. 22, 2011

(54) MAGNESIUM CHLOROAKOLATE-BASED CATALYST PRECURSORS

(75) Inventors: Giampiero Morini, Padua (IT); Antonio Cristofori, Occhiobello (IT); Benedetta Gaddi, Ferrara (IT); Dario Liguori, Forino (IT); Joachim T. M. Pater, Ferrara (IT); Gianni Vitale, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 92 days.

(21) Appl. No.: 12/308,623

(22) PCT Filed: Jun. 1, 2007

(86) PCT No.: PCT/EP2007/055386
§ 371 (c)(1),
(2), (4) Date: Dec. 19, 2008

(87) PCT Pub. No.: WO2007/147714
PCT Pub. Date: Dec. 27, 2007

(65) Prior Publication Data
US 2010/0160154 A1    Jun. 24, 2010

Related U.S. Application Data

(60) Provisional application No. 60/817,543, filed on Jun. 29, 2006.

(30) Foreign Application Priority Data

Jun. 23, 2006   (EP) .................................. 06115953

(51) Int. Cl.
*C08F 4/64*   (2006.01)
(52) U.S. Cl. ........................................................ 502/115
(58) Field of Classification Search .................. None
See application file for complete search history.

(56) References Cited

U.S. PATENT DOCUMENTS

| | | | |
|---|---|---|---|
| 4,168,361 | A | 9/1979 | Oda et al. |
| 4,220,554 | A | 9/1980 | Scata' et al. |
| 4,226,741 | A | 10/1980 | Luciana et al. |
| 4,298,718 | A | 11/1981 | Mayr et al. |
| 4,315,835 | A | 2/1982 | Scata' et al. |
| 4,485,187 | A | 11/1984 | Nomura et al. |
| 4,971,937 | A | 11/1990 | Albizzati et al. |
| 5,539,067 | A | 7/1996 | Parodi et al. |
| 7,022,640 | B2 | 4/2006 | Morini et al. |

FOREIGN PATENT DOCUMENTS

| | | |
|---|---|---|
| EP | 0273693 | 7/1988 |
| EP | 0604850 B1 * | 6/1994 |
| EP | 0604850 | 7/1994 |
| EP | 0728769 | 8/1998 |
| EP | 0446801 | 2/2001 |
| JP | 54062288 | 5/1979 |
| JP | 55086805 | 7/1980 |
| WO | WO 96/32426 | 10/1996 |
| WO | WO 99/33843 | 7/1999 |
| WO | WO 01/44312 | 6/2001 |
| WO | WO 2005/095472 | 10/2005 |

* cited by examiner

*Primary Examiner* — Melvin Mayes
*Assistant Examiner* — Stefanie Cohen
(74) *Attorney, Agent, or Firm* — Dilworth IP, LLC

(57) ABSTRACT

Catalyst precursors comprising Mg, Cl, Ti, and OR groups that are in molar ratios defined by the formula $MgCl_nTi_p(OR)_{(2-n)+4p}$ in which n is from 0.3 to less than 1.7, p is lower than 0.6, the molar ratio (OR)/Cl is lower than 4 and R is C1-C15 hydrocarbon groups. The said precursor, just upon activation with organo-Al compounds, are able to advantageously polymerize ethylene and alpha olefins, and that upon reaction with halogenating compounds generate in high yields catalyst components with high polymerization activity particularly in the polymerization of propylene also in combination with 1,3-diethers.

13 Claims, No Drawings

MAGNESIUM CHLOROAKOLATE-BASED CATALYST PRECURSORS

This application is the U.S. national phase of International Application PCT/EP2007/055386, filed Jun. 1, 2007, claiming priority to European Application 06115953.9 filed Jun. 23, 2006 and the benefit under 35 U.S.C. 119(e) of U.S. Provisional Application No. 60/817,543, filed Jun. 29, 2006; the disclosures of International Application PCT/EP2007/055386, European Application 06115953.9 and U.S. Provisional Application No. 60/817,543, each as filed, are incorporated herein by reference.

The present invention relates to catalyst precursors comprising compounds including at least a magnesium compound and a titanium compound in specific molar ratios. The catalyst precursors of the present invention are particularly useful in the preparation of Ziegler-Natta catalyst components for the polymerization of olefins.

The modern Ziegler-Natta catalysts including titanium compounds supported on magnesium halides are well known in the art. Catalysts of this type are described in the U.S. Pat. No. 4,298,718. Said catalysts comprise titanium tetrahalides supported on halides of magnesium. Although the catalysts have high activity in the polymerization of alpha olefins like propylene, they are not very stereospecific. Improvements to stereospecificity have been made by adding electron-donor compounds to the solid catalyst component.

Substantial improvements were obtained by using, in addition to the electron-donor present in the solid component, an electron-donor (external) added together with the aluminum alkyl co-catalyst component to the polymerization reactor.

The catalysts modified in this manner although being highly stereospecific (the propylene polymer is about 94-95% insoluble in xylene at room temperature) still did not show sufficiently high levels of activity.

Significant improvements in both activity and stereospecificity were obtained by preparing the solid catalytic component according to the technique described in U.S. Pat. No. 4,226,741. High level performance in catalyst activity as well as stereospecificity has been obtained with the catalysts described in EP 045977. Said catalysts comprise as solid catalysts component, a magnesium halide on which is supported a titanium halide, preferably $TiCL_4$, and an electron-donor compound, selected from specific classes of carboxylic acid esters, and, as co-catalyst component, a system formed of an Al-trialkyl compound and a silicon compound containing at least one Si—OR bond (R hydrocarbon radical).

Although the results described above were interesting, research activities have been continued with the purpose of modifying and/or improving the performance of the mentioned catalysts. The European Patent 0361494 and EP 728769 describe very active solid catalyst components for the polymerization of olefins comprising, as an internal electron-donor compound, a 1,3-diether characterized by a specific structure and/or by specific reactivity characteristics toward the anhydrous magnesium chloride and $TiCl_4$.

The catalysts obtained from the reaction of said catalyst components with an Al-alkyl compound exhibit a so high activity and stereospecificity in the polymerization of olefins, that the use of an external electron-donor can be avoided.

The catalyst activity is particularly high when the catalyst is obtained starting from precursors comprising adducts of formula $MgCl_2(ROH)_n$ where R is a C1-C10 alkyl group, preferably ethyl, and n is from 2 to 6. When a precursor of this type is reacted with the titanium compound, usually $TiCl_4$, a large amount of hydrochloric acid evolves, which must be neutralized and removed. Moreover, it has to be considered that the yield of such a support is not particularly high. For example the amount of final catalyst obtained generally contains $MgCl_2$ in an amount which is only about 40% by weight of the amount of the starting support considering an n value of about 3. The percentage is even lower when n has higher values. Precursors that do not generate hydrogen chloride and that yield higher proportions of final catalysts are for example those disclosed in U.S. Pat. No. 4,220,554 that are of general formula $MgX_n(OR)_{2-n}$. Moreover, these precursors are able to generate a final catalyst characterized by a narrow particle size distribution even when the catalyst particles have small average diameter such as lower than 50 μm. One problem associated with this kind of precursor however was due to the not particularly high polymerization activity (in terms of amount of polymer per g of catalyst component) in the propylene polymerization when the catalyst is generated from the said precursor and contains 1,3-diethers as internal donors. In addition, also the properties of the catalyst generated by said precursor for the ethylene polymerization are not satisfactory. In WO2005/095472, precursors of formula $MgCl_n(OR)_{2-n}LB_p$ in which LB is a Lewis base n is from 0.1 to 1.9, p is higher than 0.4, and R is a C1-C15 hydrocarbon group are prepared. While once reacted with an excess of titanium halide in the presence of a 1,3-diether as internal donor the derived catalysts are able to show high activity and stereospecificity in the propylene polymerization, their performances in the ethylene polymerization as a balance of activity, hydrogen response and morphological properties are not satisfactory. It is therefore still felt the need of a versatile catalyst precursor capable of producing catalysts, in a wide range of particle dimension and with narrow particle size distribution with valuable properties both for ethylene and propylene polymerization and that during its conversion into the final catalyst does not generate substantial amounts of hydrogen chloride.

The applicant has now found novel precursors that just upon activation with organo-Al compounds are able to advantageously polymerize ethylene and alpha olefins, and that upon reaction with Ti compounds generate in high yields catalyst components with high polymerization activity in the polymerization of propylene also in combination with 1,3-diethers.

The said catalyst precursors comprising Mg, Cl, Ti, and OR groups that are in molar ratios defined by the formula $MgCl_n\text{-}Ti_p(OR)_{(2-n)+4p}$ in which n is from 0.3 to less than 1.7, p is lower than 0.6, the molar ratio (OR)/Cl is lower than 4 and R is C1-C15 hydrocarbon groups.

Preferably, p is lower than 0.5 and more preferably lower than 0.45 and especially it ranges from 0.4 to 0.1.

In a particular aspect of the present invention, n ranges from 0.4 to 1.6 and more preferably from 0.5 to 1.5 and especially from 0.6 to 1.4.

Preferably, the molar ratio (OR)/Cl is lower than 3.8 and preferably is in the range of from 1.5 to 3.5.

R is preferably selected from C1-C10 linear or branched alkyl groups and in particular from C1-C8 linear or branched alkyl groups. Among them, methyl, ethyl, propyl, n-butyl, isobutyl, sec butyl and t-butyl are preferred. Ethyl is especially preferred.

As mentioned above the particle size distribution can be narrow and this is expressed by the low value of the SPAN measurements carried out as mentioned below. Generally the SPAN is lower than 1.8 preferably lower than 1.5, more preferably lower than 1.2 and especially lower than 1. Interestingly, such a narrow particle size distribution is also obtained in combination with small average particle dimensions (P50) such as those lower than 30 μm and especially lower than 20 μm.

The precursors of the present invention can be prepared according to several methods. One of the preferred methods comprises bringing into contact a Mg compound of formula of $MgCl_n(OR)_{2-n}$ in which n is from 0.3 to less than 1.7, and R is as defined above, preferably ethyl, with a titanium compound of formula $Ti(OR)_4$ where R has the same meaning as defined above preferably ethyl, in a suitable inert liquid medium. The inert medium is selected among organic or inorganic liquids which are inert to the reactants mentioned above. Preferably they are selected among hydrocarbon liquid media, possibly halogenated, commonly used in the practice. Examples are hexane, heptane, liquid paraffins, benzene, toluene, Cl-Benzene. The initial contact is preferably carried out at room temperature but then the temperature is raised under stirring, and brought to a value within the range 100-200° C. in order to cause the reaction to take place. The maximum temperature at which the reaction takes place is also connected to the reaction time and to the stirring speed. Relatively high stirring speed may facilitate the reaction which can therefore be completed at relatively lower temperatures and shorter time. On the other hand, at higher temperatures the reaction is prone to be faster and this may allow slower stirring speed. Preferably, the reaction takes place at a maximum temperature in the range from 50 to 200° C. and preferably from 70 to 190° C. Preferably, the molar ratios among the titanium compound and Mg compound used as starting components already reflect those found on the final solid. Therefore, the Ti compound is preferably used in molar ratios lower than 0.6 with respect to the Mg compound. If desired however, it is also possible to use higher molar ratios.

The $MgCl_n(OR)_{2-n}$ compounds can be generated by exchange reaction between organometallic compounds of formula $Cl_mMgR_{2-m}$, where m is from 0.1 to 1.9, and R is a hydrocarbon group, with an appropriate —OR source. The OR sources are for example ROH alcohols or, preferably, a silicon compound of formula $(RO)_rSiR_{4-r}$, where r is from 1 to 4 and R has the meaning given above, silicon tetra-ethoxide being preferred. In turn, as generally known in the art, organometallic compounds of formula $Cl_mMgR_{2-m}$ can be obtained by reaction between Mg metal and an organic chloride RCl, in which R is as defined above, optionally in the presence of suitable promoters. Preferably, the formation of $Cl_mMgR_{2-m}$ and the further exchange with the OR source takes place in one single step. The reaction can be carried out in inert medium such as hydrocarbon that is liquid at room temperature.

According to a further method, the catalyst precursors of the invention can be prepared by causing mixtures of $MgCl_2$ and $Mg(OR)_2$ to react in the presence of the $Ti(OR)_4$ compound in an inert medium.

This reaction can take place according to the same process conditions described above for the use of $MgCl_n(OR)_{2-n}$ as one of starting compounds. In the absence of further halogen sources, the molar ratio between $MgCl_2$ and $Mg(OR)_2$ is generally from 0.8 to 3, preferably from 0.9 to 2 and more preferably 1.

According to an alternative embodiment, a solution in a solvent having a boiling temperature higher than 60° C., of $MgCl_2$, $Mg(OR)_2$ and $Ti(OR)_4$ is obtained by adding a suitable amount of an aprotic Lewis base. Preferably, also a lower amount of a protic Lewis base is used to facilitate the dissolution. The aprotic Lewis base is preferably selected from ethers, esters, ketones, silanes, amines, nitriles and amides. Preferably, it is selected from ethers or esters. Preferred ethers are the C2-C20 aliphatic ethers and in particular the cyclic ethers preferably having 3-5 carbon atoms such as tetrahydrofurane (THF), dioxane.

Preferred esters are the alkyl esters of C1-C20 aliphatic carboxylic acids and in particular C1-C8 alkyl esters of aliphatic mono carboxylic acids such as ethyl acetate, methyl formate, ethyl formiate, methyl acetate, propyl acetate, isopropyl acetate, n-butyl acetate, isobutyl acetate.

Preferred alkoxysilanes are those of formula $R^1{}_aR^2{}_bSi(OR^3)_c$, where a and b are integer from 0 to 2, c is an integer from 1 to 4 and the sum (a+b+c) is 4; $R^1$, $R^2$, and $R^3$, are alkyl, cycloalkyl or aryl radicals with 1-18 carbon atoms optionally containing heteroatoms. Particularly preferred are the silicon compounds in which a is 0 or 1, c is 2 or 3, $R^2$ is an alkyl or cycloalkyl group, optionally containing heteroatoms, and $R^3$ is methyl. Examples of such preferred silicon compounds are methyltrimethoxysilane, dimethyldimethoxysilane, trimethylmethoxysilane and t-butyltrimethoxysilane.

Preferred ketones are those of formula $R^4COR^4$, in which the $R^4$ groups are, independently, a C1-C20 hydrocarbon group. Particularly preferred are the ketones in which at least one of $R^4$ is a C1-C10 alkyl group.

Preferred amines are those of formula $NR^5{}_3$ in which the $R^5$ groups are, independently, a C1-C20 hydrocarbon group. Preferably, $R^5$ is a C1-C10 alkyl group. Specific examples are triethylamine, triisopropylamine and tri-n-butylamine.

Preferred amides are those of formula $R^6CONR^7{}_2$, in which $R^6$ is hydrogen or a C1-C20 hydrocarbon group and $R^7$ are, independently, a C1-C20 hydrocarbon group. Specific examples are N,N-dimethylformamide and N,N-dimethylacetamide.

Preferred nitriles are those of formula $R^8CN$ where $R^8$ has the same meaning as $R^4$. A specific example is acetonitrile. Preferably, $R^8$ is a C1-C10 alkyl group. Specific examples are methyl, ethyl, isopropyl, and butyl.

Among the protic Lewis base (poly)alcohols are preferred. Particularly those of formula R(OH) in which R has the same meaning given above are preferred.

The so obtained solution is brought at a temperature higher than 60° C. and preferably higher than 80° C. most preferably operating at the reflux temperature of the solvent. By doing so precipitation of the solid catalyst precursor of the invention occurs. Also in this case, control of the particle size distribution can be obtained by properly operating the stirring speed in the reactor. While the specific effects are also influenced by the geometry of the reactor, in general higher stirring speed allows the precipitation of the catalyst precursor with a lower particle size.

It is worth noting that often even by starting with higher amounts of Ti compound the precipitated catalyst precursor has the same brute formula above reported which indicates the formation of a specific compound. The confirmation about the obtainment of a crystalline pure product is obtained through the RX analysis showing sharp signals that where absent in the RX of the starting products and by the absence of signals attributable to the starting compounds. Regardless of the preparation method the precursors of the invention can, as such, already be used; in combination with an organo Al-compound preferably halogenated, in the polymerization of olefins and in particular of ethylene optionally in mixtures with alpha-olefins. Moreover, as mentioned above, these precursors can be advantageously used in the preparation of catalyst components for the polymerization of olefins. The said catalyst components can be obtained by contacting the precursors of the invention with compounds having halogenating capability. Among them, preferred are halogenated organo-Al compounds and fully or partially halogenated transition metals belonging to one of the groups 4 to 6 of the Periodic Table of Elements (new notation). Among transition metal compounds particularly preferred are titanium compounds of formula $Ti(OR)_nX_{y-n}$ in which n is comprised between 0 and 3; y is the valence of titanium; X is halogen and R is an alkyl radical having 1-10 carbon atoms or a COR group. Among them, particularly preferred are titanium tetrahalides or trihalogenalcoholates. Preferred specific titanium compounds are $TiCl_3$, $TiCl_4$, $Ti(OBu)Cl_3$, $Ti(OBu)_2Cl_2$. Preferably the contact is carried out by suspending the precursor in cold $TiCl_4$ (generally 0° C.); then the so obtained mixture is heated up to 30-130° C. and kept at this temperature for 0.1-2 hours. After that the excess of $TiCl_4$ is removed and the solid component is recovered. The treatment with $TiCl_4$ can be carried out one or more times. As mentioned above, also a steromodulating electron donor compound can be added to the solid catalyst component in order to make it stereospecific for the alpha-olefins polymerization. The introduction of the electron donor can be done simultaneously with the reaction between transition metal compound and the adduct. When an internal donor is used, the maximum titanation temperature is preferably higher than 80° C. As a result of this contact the electron donor compound normally remains deposited on the catalyst component. Said electron donor compound can be same as, or different from, the LB compound mentioned above and is generally selected from esters, ethers, amines, and ketones. In particular, as mentioned above, excellent results have been obtained with the use of 1,3-diethers of formula (I)

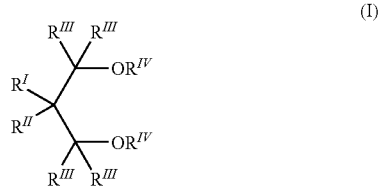
(I)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(p-fluorophenyl)-1,3-dimethoxypropane, 2-(1-decahydronaphthyl)-1,3-dimethoxypropane, 2-(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (II)

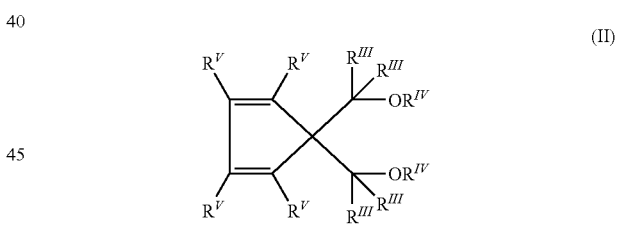
(II)

where the radicals $R^{IV}$ have the same meaning explained above and the radicals $R^{III}$ and $R^V$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both. Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Especially preferred are the compounds of formula (III):

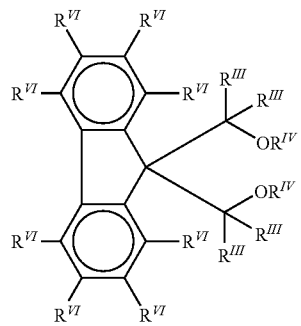

(III)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II). Specific examples of compounds comprised in formulae (II) and (III) are: 1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl)-indene; 1,1-bis(methoxymethyl)-2,3-dimethylindene; 1,1-bis(methoxymethyl)-4,5,6,7-tetrahydroindene; 1,1-bis(methoxymethyl)-2,3,6,7-tetrafluoroindene; 1,1-bis(methoxymethyl)-4,7-dimethylindene; 1,1-bis(methoxymethyl)-3,6-dimethylindene; 1,1-bis(methoxymethyl)-4-phenylindene; 1,1-bis(methoxymethyl)-4-phenyl-2-methylindene; 1,1-bis(methoxymethyl)-4-cyclohexylindene; 1,1-bis(methoxymethyl)-7-(3,3,3-trifluoropropyl)indene; 1,1-bis(methoxymethyl)-7-trimethylsilylindene; 1,1-bis(methoxymethyl)-7-trifluoromethylindene; 1,1-bis(methoxymethyl)-4,7-dimethyl-4,5,6,7-tetrahydroindene; 1,1-bis(methoxymethyl)-7-methyl indene; 1,1-bis(methoxymethyl)-7-cyclopenthylindene; 1,1-bis(methoxymethyl)-7-isopropylindene; 1,1-bis(methoxymethyl)-7-cyclohexylindene; 1,1-bis(methoxymethyl)-7-tert-butyl indene; 1,1-bis(methoxymethyl)-7-tert-butyl-2-methylindene; 1,1-bis(methoxymethyl)-7-phenyl indene; 1,1-bis(methoxymethyl)-2-phenylindene; 1,1-bis(methoxymethyl)-1H-benz[e]indene; 1,1-bis(methoxymethyl)-1H-2-methylbenz[e]indene; 9,9-bis(methoxymethyl)-fluorene; 9,9-bis(methoxymethyl)-2,3,6,7-tetramethylfluorene; 9,9-bis(methoxymethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-disopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butyl fluorene.

The catalyst components obtained by using these diethers in fact have improved properties, in terms of polymerization activity and stereospecificity, over those obtained by contacting the titanium compound and the 1,3-diether with precursors of the prior art such as those described in U.S. Pat. No. 4,315,835.

Suitable electron donors are also the alkyl and aryl esters of mono- or poly-carboxylic acids, preferably for example esters of benzoic, phthalic, malonic, glutaric and succinic acids. Specific examples of such esters are di-n-butyl phthalate, diisobutyl phthalate, di-n-octyl phthalate, diethyl 2,3-diisopropylsuccinate, diethyl 2,3-dicyclohexylsuccinate, ethyl benzoate and ethyl p-ethoxybenzoate.

The electron donor compound used in the preparation of the catalyst generally ranges, in molar ratios with respect to the magnesium, from 1:2 to 1:20.

The solid catalyst components according to the present invention may show a surface area (by B.E.T. method) generally between 10 and 500 $m^2/g$ and preferably between 20 and 350 $m^2/g$. The catalyst components of the invention form catalysts for the polymerization of alpha-olefins $CH_2$=CHR, wherein R is hydrogen or a hydrocarbon radical having 1-12 carbon atoms, by reaction or contact with organo-Al compounds in particular Al-alkyl compounds. The alkyl-Al compound is preferably chosen among the trialkyl aluminum compounds such as for example triethylaluminum (TEAL), triisobutylaluminum (TIBAL), tri-n-butylaluminum, tri-n-hexylaluminum, tri-n-octylaluminum. Particularly in the ethylene(co)polymerization, it is preferred to use alkylaluminum halides, alkylaluminum hydrides or alkylaluminum sesquichlorides such as $AlEt_2Cl$ and $Al_2Et_3Cl_3$ more preferably in mixture with said trialkylaluminum compounds. Specific mixtures TEAL/DEAC in various ratios are preferred. The total Al/Ti ratio is higher than 1 and is generally comprised between 20 and 800.

In the case of the stereoregular polymerization of α-olefins, such as for example propylene and 1-butene, an electron donor compound (external donor) which can be the same or different from the compound used as internal donor can be used in the preparation of the catalysts disclosed above. In case the internal donor is an ester of a polycarboxylic acid, in particular a phthalate, the external donor is preferably selected from the silicon compounds containing at least a Si—OR link, having the formula $R_a^1 R_b^2 Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, and dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the 1,3-diethers having the previously described formula can be used as external donor. However, in the case 1,3-diethers are used as internal donors, the use of an external donor could be avoided, as the stereospecificity of the catalyst is already sufficiently high for polymers to be used in various applications.

As previously indicated, the components of the invention and catalysts obtained therefrom find applications in the processes for the (co)polymerization of olefins of formula $CH_2=CHR$ in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. The slurry or bulk polymerization can be carried out both in agitated vessels or in loop reactors. It is also possible to use two or more vessels or loop reactors connected in series or running in parallel. Moreover, the catalyst described in the present application can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to illustrate and not to limit the invention itself.

Characterization
Determination of X.I.

2.50 g of polymer were dissolved in 250 ml of o-xylene under stirring at 135° C. for 30 minutes, then the solution was cooled to 25° C. and after 30 minutes the insoluble polymer was filtered off. The resulting solution was evaporated in nitrogen flow and the residue was dried and weighed to determine the percentage of soluble polymer and then, by difference, the xylene insoluble fraction (%).

Particle Size Distribution (Span)

According to the present invention the particle size distribution (SPAN) is calculated with the formula $$\frac{P90 - P10}{P50},$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

Particle Size of the Catalyst (P90; P10 P50)

Determined by a method based on the principle of the optical diffraction of monochromatic laser light with the "Malvern Instr. 2600" apparatus. The average size is given as P50.

Melt Index: measured at 190° C. according to ASTM D-1238 condition "L"

Intrinsic viscosity: determined in tetrahydronaphthalene at 135° C.

Determination of Mg, Ti: has been carried out via inductively coupled plasma emission spectroscopy (ICP).

Determination of Cl: has been carried out via potentiometric tritration.

Determination of alkoxides (as ROH): via Gas-Chromatography analysis after hydrolysis of the catalyst.

Comonomer Content

1-Butene or α-olefins were determined via Infrared Spectrometry.

Effective density: ASTM-D 1505

EXAMPLES

General Procedure for Polymerization of Propylene without External Donor (Procedure I)

In a 4 L autoclave, purged with a nitrogen flow at 70° C. for 2 h, 75 mL of anhydrous hexane containing 600 mg of AlEt$_3$ and 6.00 mg of solid catalyst prepared as described above were introduced in propylene flow at 30° C. The autoclave was closed. At the same temperature 1.2 NL of hydrogen were added and then, under stirring, 1.2 Kg of liquid propylene were fed. The temperature was raised to 70° C. in five minutes and the polymerization was carried out at this temperature for 2 h. After that, the non-reacted propylene was removed, the formed polymer was collected, dried at 70° C. under vacuum for 3 h, then weighted and analyzed for the amount of present Mg residues, based on which the activity of the catalyst was calculated.

General Procedure for Polymerization of Propylene with External Donor (Procedure II)

In a 4 L autoclave, purged with a nitrogen flow at 70° C. for 2 h, 75 mL of anhydrous hexane containing 760 mg of AlEt$_3$, 63.0 mg of dicyclopentyldimethoxysilane and 10.0 mg of solid catalyst prepared as described above were introduced in propylene flow at 30° C. The autoclave was closed. At the same temperature 2.0 NL of hydrogen were added and then, under stirring, 1.2 Kg of liquid propylene were fed. The temperature was raised to 70° C. in five minutes and the polymerization was carried out at this temperature for 2 h. After that, the non-reacted propylene was removed, the formed polymer was collected, dried at 70° C. under vacuum for 3 h, then weighted and analyzed for the amount of present Mg residues, based on which the activity of the catalyst was calculated.

General Procedure for Homopolymerization of Ethylene (Procedure A)

A 4.5 liter stainless-steel autoclave equipped with a stirrer, temperature and pressure indicator, feeding line for hexane, ethylene, and hydrogen, was used and purified by fluxing pure nitrogen at 70° C. for 60 minutes. Then, 1550 cm$^3$ of hexane containing 4.9 cm$^3$ of 10% by wt/vol TEA/DEAC 2:1 hexane solution, was introduced at a temperature of 30° C. under nitrogen flow. In a separate 200 cm$^3$ round bottom glass bottle were successively introduced, 50 cm$^3$ of anhydrous hexane, 1 cm$^3$ of 10% by wt/vol, TEA/DEAC 2:1 (wt:wt) hexane solution and about 0.010÷0.025 g of the solid catalyst of table 1.

They were mixed together, aged 10 minutes at room temperature and introduced under nitrogen flow into the reactor. The autoclave was closed, then the temperature was raised to 85° C., hydrogen (partial pressure as indicated in table 2) and ethylene (7.0 bars partial pressure) were added. Under continuous stirring, the total pressure was maintained at 85° C. for 120 minutes by feeding ethylene. At the end the reactor was depressurised and the temperature was dropped to 30° C. The recovered polymer was dried at 70° C. under a nitrogen flow.

General Procedure for Homopolymerization of Ethylene (Procedure B)

The procedure is the same as Procedure (A) with the difference that only TEA (no DEAC) is used.

General Procedure for the Copolymerization of Ethylene

A 4.5 liter stainless-steel autoclave equipped with a stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (the amount reported in table 3), ethylene (7.0 bar, partial pressure) and hydrogen (as in table 3).

In a 100 cm$^3$ three neck glass flask were introduced in the following order, 50 cm$^3$ of anhydrous hexane, the TEAL/DEAC 50:50 molar hexane solution the external electron donor compound (Tetrahydrofurane Al/THF molar ratio 5) and the solid catalyst (0.005-0.015 g). They were mixed together and stirred at room temperature for 5 minutes and then introduced in the reactor through the steel vial by using a nitrogen overpressure.

Under continuous stirring, the total pressure was maintained constant at 75° C. for 60 minutes by feeding ethylene. At the end the reactor was depressurized and the temperature was dropped to 30° C. The recovered polymer was dried at 70° C. under a nitrogen flow and weighted.

Examples

Example 1

To a four-necked flask with a stirrer, a reflux-cooler and a thermometer, kept in a inert gas atmosphere and containing 8 g (0.084 mol) of $MgCl_2$ and 9.6 g of $MgOEt_2$ (0.084 mol), where slowly added, in sequence, 54.5 ml of THF (0.673 mol), 9.7 ml of EtOH (0.168 mol), 10.3 ml of $Ti(OEt)_4$ (0.05 mol) and 100 ml of toluene.

The mixture was heated at 45° C. for 4 h to obtain a solution. At this point, the solution was heated under reflux (about 88° C.) while maintaining the stirring speed about 800 rpm. After few minutes under reflux, the solution became opalescent with the formation of a precipitate. After 3 h of reflux, the precipitated solid was recovered by filtration, washed twice with 50 ml of toluene, thrice with 100 ml of hexane and finally dried under vacuum. 16 g of granular solid were recovered, with an average particle size of 10 micron with a narrow particle size distribution (Span 0.8).

Elemental analysis showed that this product contained Mg, Ti, Cl and $C_2H_5O$ (determined as $C_2H_5OH$) in the molar ratio Mg/Ti/Cl/$C_2H_5O$ of 1/0.30/0.72/2.36. X-ray analysis showed no signals attributable to the starting magnesium compounds.

The so obtained catalyst was used in the homopolymerization of ethylene according to procedure (A). The results are reported in table 1.

Example 2

An amount of the catalytic precursor prepared according to Example 1 was reacted with EASC in hexane, using the following conditions: Cl/EtO=1.65 molar ratio; T=65° C.; t=1 h. Then solid was recovered by filtration, washed twice with hexane and dried under vacuum. The so obtained catalyst was used in the homopolymerization of ethylene according to procedure (A) and (B) and in the copolymerization of ethylene according to the general procedure. The results are reported in table 1.

Example 3

The synthesis of the catalyst precursor according to Example 1 was repeated, the only differences being that amount of $Ti(OEt)_4$ used was 17.4 ml (0.084 mol) and stirring speed was 600 rpm. The solid recovered was analyzed and found to have the following molar ratios: Mg/Ti/Cl/ETOH 1/0.32/0.74/2.49. X-ray analysis showed no signals attributable to the starting magnesium compounds. Average particle size was 28 micron and particle size distribution was narrow (SPAN 0.9). The so obtained catalyst precursor was used in the homopolymerization of ethylene according to procedure (A). The results are reported in table 1.

Example 4

Using the same equipment and procedure as disclosed in Example 1, a solution (A) was obtained using $MgCl_2$ (0.084 mol), $MgOEt_2$ (0.084 mol), THF (0.673 mol), EtOH (0.168 mol) and $Ti(OEt)_4$ (0.05 mol).

This solution, was converted in solid powder by using a Büchi Mini Spray Dryer, model B-290. The solution was sprayed with a feed rate of 13 mL/min, with nitrogen as carrier gas, at an inlet temperature of 130° C., and an outlet temperature of 96° C.

The recovered solid showed spherical shape, an average particle size of 15 micron, and found to have the following molar ratios: Mg/Ti/Cl/ETOH 1/0.29/1.01/2.03. X-ray analysis showed no signals attributable to the starting magnesium compounds.

About 10 g of the catalytic component of the so obtained catalyst precursor, where introduced into a four-necked flask equipped with a stirrer, a reflux-cooler and a thermometer, kept in a inert gas atmosphere and containing 250 ml of $TiCl_4$ thermostatted at −5° C. The temperature was slowly raised to room temperature and then raised at 1.5° C./min. to 130° C. At this temperature the suspension was stirred for 1 hour. Then the liquid was removed and fresh $TiCl_4$ (250 ml) was added at room temperature. The temperature was raised at 130° C. and the suspension was stirred at 130° C. for 0.5 hours. The solid was filtered, washed twice with hexane and vacuum dried. The so obtained catalyst was used in the homopolymerization of ethylene according to procedure (A). The results are reported in table 1.

Example 5

In a 0.5 liter reactor, kept under inert conditions, 12.0 g of the catalyst precursor of Example 1 were suspended in 300 ml of $TiCl_4$ cooled at 0° C. Under stirring the temperature was increased slowly to 40° C. and 2.8 g of 9,9-bis-methoxymethyl-fluorene. The temperature was raised to 100° C., and the reaction mixture stirred at that temperature for 2 hours. After that, the stirrer was stopped and the liquid was removed by filtration. 300 ml of fresh $TiCl_4$ were added and the slurry stirred at 110° C. for 30 minutes. After that, stirring was discontinued, and the liquid was removed by filtration. 300 ml of fresh $TiCl_4$ were added and the slurry stirred at 110° C. for 30 minutes. After that, stirring was discontinued, and the liquid was removed by filtration. The solid was washed 5 times with hot hydrocarbon and dried under vacuum. It was obtained 10.0 g of granular catalyst with an average particle size of 12 micron, a narrow particle size distribution (SPAN 1) and the following composition: Mg 12.8% wt, Ti 4.3% wt, 9,9-bis-methoxymethyl-fluorene 12.5% wt. The so obtained catalyst was used in the homopolymerization of propylene according to procedures (I and II). The results are reported in table 2.

Comparative Example 1

The synthesis of the precursor was performed as described in Example 1 of U.S. Pat. No. 4,220,554. The so obtained support has the following composition: Mg, 20.2 wt. %; Cl, 29.8 wt. %; EtOH groups 41.5 wt. %. To 12 g of this precursor the same procedure of example 5 was applied. The so obtained catalyst was used in the homopolymerization of propylene according to procedures (I and II). The results are reported in table 2.

Example 6

In a 1 liter reactor, kept under inert conditions, 19.0 g of $MgCl_2$ (200 mmol), 22.8 g of $Mg(OEt)_2$ (200 mmol) and 44.2 g of $Ti(OEt)_2$ (200 mmol) were mixed at room temperature with 500 ml of Isopar L. The slurry thus obtained was kept at 150° C. for 7 hours under vigorous stirring (600 rpm). The product obtained was filtered, washed 3 times with hot hydrocarbon and then dried under vacuum.

It was obtained 59.0 g of granular solid with an average particle size of 12 micron, a narrow particle size distribution (SPAN 0.9) and a composition according to the following molar ratios: Mg/Ti/Cl/ETOH 1/0.31/1.16/2.06. X-ray analysis showed no signals attributable to the starting magnesium compounds. The so obtained catalyst was used in the homopolymerization of ethylene according to procedure (A). The results are reported in table 1.

Example 7

In a 0.5 liter reactor, kept under inert conditions 10 g of catalyst precursor prepared according to the procedure of Example 6 were suspended in 250 ml of $TiCl_4$ cooled at 0° C. Under stirring the temperature was increased to 30° C. in 30 minutes. The reaction mixture stirred at 30° C. for 30 minutes, then the stirrer was stopped and the liquid was removed by filtration. 250 ml of fresh $TiCl_4$ were added and the slurry stirred at 30° C. for 30 minutes. The solid was filtered, washed 5 times with hydrocarbon and dried under vacuum. The so obtained catalyst was used in the homopolymerization of ethylene according to procedure (B). The results are reported in table 1.

Example 8

In a 0.5 liter reactor under inert condition 12.0 g of catalyst precursor of Example 6 were suspended in 300 ml of $TiCl_4$ cooled at 0° C. Under stirring the temperature was increased slowly to 100° C., at 40° C. were added 2.8 g of 9,9-bis-methoxymethyl-fluorene. The temperature was raised to 100° C., and the reaction mixture stirred at that temperature for 2 hours. After that, the stirrer was stopped and the liquid was removed by filtration. 300 ml of fresh $TiCl_4$ were added and the slurry stirred at 110° C. for 30 minutes. After that, stirring was discontinued, and the liquid was removed by filtration. 300 ml of fresh $TiCl_4$ were added and the slurry stirred at 110° C. for 30 minutes. After that, stirring was discontinued, and the liquid was removed by filtration. The solid was washed 5 times with hot hydrocarbon and dried under vacuum. The so obtained catalyst was used in the homopolymerization of propylene according to the general procedure I. The results are reported in table 2.

Example 9

A solid catalyst precursor was prepared according to the same procedure disclosed in example 6 with the only difference that the Ti/Mg molar ratio was 1 and that the reaction time was 3 hours. It was obtained a granular solid with an average particle size of 12 micron, a narrow particle size distribution (SPAN 0.7) and a composition according to the following molar ratios: Mg/Ti/Cl/ETOH 1/0.31/0.92/2.30. X-ray analysis showed no signals attributable to the starting magnesium compounds. The so obtained catalyst was used in the homopolymerization of ethylene according to procedure (A). The results are reported in table 1.

Example 10

A solid catalyst precursor was prepared according to the same procedure disclosed in example 6 with the only difference that the reaction temperature was 180° C. and reaction times 3 hrs. It was obtained a granular solid with an average particle size of 12 micron, a narrow particle size distribution (SPAN 0.8) a composition according to the following molar ratios: Mg/Ti/Cl/ETOH 1/0.29/1.10/2.05. X-ray analysis showed no signals attributable to the starting magnesium compounds. The so obtained catalyst was used in the homopolymerization of ethylene according to procedure (A) and according to a variation of said procedure in which TIBAL was used instead of TEA. The catalyst precursor was also used in the copolymerization of ethylene according to the above general procedure. The results are reported in table 1.

Example 11

A catalyst precursor was prepared according to the same procedure disclosed in example 10 with the only difference that the reaction times was 6 hrs and the stirring speed was 450 RPM. It was obtained a granular solid with an average particle size of 26 micron, a narrow particle size distribution (SPAN 1.2) a composition according to the following molar ratios: Mg/Ti/Cl/ETOH 1/0.28/0.98/2.14. X-ray analysis showed no signals attributable to the starting magnesium compounds.

In a 0.5 liter reactor, kept under inert conditions 10 g of said catalyst precursor were suspended in 250 ml of $TiCl_4$ cooled at 0° C. Under stirring the temperature was increased to 30° C. in 30 minutes. The reaction mixture stirred at 30° C. for 30 minutes, then the stirrer was stopped and the liquid was removed by filtration. 250 ml of fresh $TiCl_4$ were added and the slurry stirred at 30° C. for 30 minutes. The solid was filtered, washed 5 times with hydrocarbon and dried under vacuum. The so obtained catalyst was used in the homopolymerization of ethylene according to procedure (B). The results are reported in table 1.

Example 12

In a 0.5 liter reactor under inert condition 12.0 g of catalyst precursor of 11 were suspended in 300 ml of $TiCl_4$ cooled at 0° C. Under stirring the temperature was increased slowly to 100° C., at 40° C. were added 2.8 g of 9,9-bis-methoxymethyl-fluorene. The temperature was raised to 100° C., and the reaction mixture stirred at that temperature for 2 hours. After that, the stirrer was stopped and the liquid was removed by filtration. 300 ml of fresh $TiCl_4$ were added and the slurry stirred at 110° C. for 30 minutes. After that, stirring was discontinued, and the liquid was removed by filtration. 300 ml of fresh $TiCl_4$ were added and the slurry stirred at 110° C. for 30 minutes. After that, stirring was discontinued, and the liquid was removed by filtration. The solid was washed 5 times with hot hydrocarbon and dried under vacuum. The so obtained catalyst was used in the homopolymerization of propylene according to the general procedure I. The results are reported in table 2.

Example 13

In a 1 liter reactor under inert condition at room temperature 40.0 g of MgClOEt (Mg 18.7% wt 310 mmole 12 μm as average particle size), 35.1 g of $Ti(OEt)_4$ (155 mmole) were mixed with 500 ml of Isopar L. The slurry thus obtained was kept at 150° C. for 6 hours under agitation (350 rpm). The so obtained product obtained was filtered, washed 3 times with hot hydrocarbon and dried under vacuum. It was obtained 52.0 g of granular solid with an average particle size of 21.8 micron, a narrow particle size distribution (SPAN 1.0) and a composition according to the following molar ratios: Mg/Ti/Cl/ETOH 1/0.30/0.98/2.22.

In a 0.5 liter reactor, kept under inert conditions 10 g of said catalyst precursor were suspended in 250 ml of $TiCl_4$ cooled at 0° C. Under stirring the temperature was increased to 30° C. in 30 minutes. The reaction mixture stirred at 30° C. for 30 minutes, then the stirrer was stopped and the liquid was removed by filtration. 250 ml of fresh $TiCl_4$ were added and the slurry stirred at 30° C. for 30 minutes. The solid was filtered, washed 5 times with hydrocarbon and dried under vacuum. The so obtained catalyst was used in the homopolymerization of ethylene according to procedure (B). The results are reported in table 1.

Example 14

In a 1 liter reactor under inert condition at room temperature 40.0 g of MgClOEt (Mg 18.7% wt 310 mmole 30 μm as average particle size), 35.1 g of $Ti(OEt)_4$ (155 mmole) were mixed with 500 ml of Isopar L. The slurry thus obtained was kept at 150° C. for 6 hours under agitation (350 rpm). The so obtained product obtained was filtered, washed 3 times with hot hydrocarbon and dried under vacuum. It was obtained a granular solid with an average particle size of 33.1 micron, a narrow particle size distribution (SPAN 0.8) and a composition according to the following molar ratios: Mg/Ti/Cl/ETOH 1/0.21/1.02/1.82.

In a 0.5 liter reactor, kept under inert conditions 10 g of said catalyst precursor were suspended in 250 ml of $TiCl_4$ cooled at 0° C. Under stirring the temperature was increased to 30° C. in 30 minutes. The reaction mixture stirred at 30° C. for 30 minutes, then the stirrer was stopped and the liquid was removed by filtration. 250 ml of fresh $TiCl_4$ were added and the slurry stirred at 30° C. for 30 minutes. The solid was filtered, washed 5 times with hydrocarbon and dried under vacuum. The so obtained catalyst was used in the homopolymerization of ethylene according to procedure (A). The results are reported in table 1.

Example 15

In a 1 liter reactor under inert condition at room temperature 40.0 g of MgClOEt (Mg 18.7% wt 310 mmole 12 μm as average particle size), $Ti(OnPr)_4$ (155 mmole) were mixed with 500 ml of Isopar L. The slurry thus obtained was kept at 120° C. for 2 hours under agitation (350 rpm). The so obtained product obtained was filtered, washed 3 times with hot hydrocarbon and dried under vacuum. It was obtained a granular solid with an average particle size of 31 micron, a narrow particle size distribution (SPAN 1.1) and a composition according to the following molar ratios: Mg/Ti/Cl/ETOH/nPrOH 1/0.29/1.02/1.06/0.46. The so obtained catalyst was used in the homopolymerization of ethylene according to procedure (A). The results are reported in table 1.

Example 16

A catalyst precursor was prepared according to the same procedure disclosed in example 15 with the only difference that 155 mmoles of a 50:50 molar mixture of $Ti(OEt)_4$ and $Ti(i-OPr)_4$ were used instead of sole $Ti(OnPr)_4$. It was obtained a granular solid with an average particle size of 30 micron, a narrow particle size distribution (SPAN 1.2) and a composition according to the following molar ratios: Mg/Ti/Cl/ETOH/i-PrOH 1/0.22/1.05/1.20/0.41. The so obtained catalyst was used in the homopolymerization of ethylene according to procedure (A). The results are reported in table 1.

TABLE 1

(Co)polymerization of ethylene

| Example | Procedure | Activity Kg/g | MIE g/10' | F/E | Bulk Density g/cm³ | XS % | density g/cm³ | C4⁻ % wt |
|---|---|---|---|---|---|---|---|---|
| 1 | A | 13.6 | 1 | 29.1 | 0.38 | | | |
| 2 | A | 20.7 | 1.1 | 30.2 | 0.36 | | | |
| | B | 9.5 | 0.9 | 28.5 | 0.36 | | | |
| | Copolymerization | 9.1 | 1.9 | 24.7 | | 11.6 | 0.923 | 9.1 |
| 3 | A | 11.3 | 4.4 | 33.4 | 0.36 | | | |
| 4 | A | 11.1 | 0.4 | 36 | 0.33 | | | |
| 6 | A | 7.0 | 1.7 | 30.6 | 0.39 | | | |
| 7 | A | 116 | 0.8 | 31 | 0.22 | | | |
| 9 | A | 6.5 | 2.2 | 32.1 | 0.36 | | | |
| 10 | A | 10 | 1.7 | 30 | 0.37 | | | |
| | A/TIBA | 14.3 | 2.3 | 35.4 | 0.39 | | | |
| | Copolymerization | 11.5 | 1.6 | 22.4 | | 7.6 | 0.922 | |
| 11 | B | 38.3 | 1.1 | 32.2 | 0.278 | | | |
| 13 | B | 45 | 1.2 | 32.7 | 0.26 | | | |
| 14 | A | 6.4 | 4.1 | 31.1 | 0.36 | | | |

TABLE 1-continued (Co)polymerization of ethylene

| Example | Procedure | Activity Kg/g | MIE g/10' | F/E | Bulk Density g/cm$^3$ | XS % | density g/cm$^3$ | C4$^-$ % wt |
|---|---|---|---|---|---|---|---|---|
| 15 | A | 8 | — | — | 0.37 | | | |
| 16 | A | 8.3 | — | — | 0.38 | | | |

TABLE 2 polymerization of propylene

| Example | Procedure | Activity Kg/g | MIL | XI % | Bulk Density g/cm$^3$ |
|---|---|---|---|---|---|
| 5 | I | 118.5 | 1.7 | 97.8 | 0.33 |
|   | II | 54 | 4.8 | 99 | 0.32 |
| Comp. 1 | I | 27 | 29 | 93 | 0.38 |
|   | II | 9.7 | 15 | 97 | 0.45 |
| 8 | I | 129 | 6.1 | 97.4 | 0.42 |
| 12 | I | 107 | 6.2 | 97.5 | 0.44 |

The invention claimed is:

1. Catalyst precursors comprising Mg, Cl, Ti, and OR groups that are in molar ratios defined by the formula $MgCl_n Ti_p(OR)_{(2-n)+4p}$ wherein n is from 0.3 to less than 1.7, p is lower than 0.45, the molar ratio (OR)/Cl is lower than 4 and R is selected from C1-C15 hydrocarbon groups.

2. Catalyst precursors according to claim 1 wherein the molar ratio (OR)/Cl is lower than 3.8.

3. Catalyst precursors according to claim 1 wherein n ranges from 0.4 to 1.6.

4. Catalyst precursors according to claim 1 wherein R is selected from C1-C10 linear or branched alkyl groups.

5. Catalyst precursors according to claim 1 obtained by contacting a Mg compound of formula of $MgCl_n(OR)_{2-n}$ wherein n is from 0.3 to less than 1.7, with a titanium compound of formula $Ti(OR)_4$ in an inert liquid medium.

6. Catalyst precursors according to claim 1 obtained by (a) providing a solution in a solvent having a boiling temperature higher than 60° C., of $MgCl_2$, $Mg(OR)_2$, $Ti(OR)_4$ and a suitable amount of an aprotic Lewis base, and (b) reacting the solution of step (a) at a temperature higher than 60° C. thereby causing formation of a precipitate.

7. Catalyst precursors according to claim 6 wherein in step (a) a protic Lewis base is present.

8. A catalyst component for olefin polymerization obtained by reacting a catalyst precursor comprising Mg, Cl, Ti, and OR groups that are in molar ratios defined by the formula $MgCl_n Ti_p(OR)_{(2-n)+4p}$ wherein n is from 0.3 to less than 1.7, p is lower than 0.45, the molar ratio (OR)/Cl is lower than 4 and R is selected from C1-C15 hydrocarbon groups with a halogenating agent.

9. The catalyst components according to claim 8 wherein the halogenating agent is selected from halogenated organo-Al compounds and fully or partially halogenated compounds of transition metals belonging to one of the groups 4 to 6 of the Periodic Table of Elements.

10. A catalyst for olefin polymerization obtained by reacting a catalyst component obtained by reacting a catalyst precursor comprising Mg, Cl, Ti, and OR groups that are in molar ratios defined by the formula $MgCl_n Ti_p(OR)_{(2-n)+4p}$ wherein n is from 0.3 to less than 1.7, p is lower than 0.45, the molar ratio (OR)/Cl is lower than 4 and R is selected from C1-C15 hydrocarbon groups with a halogenating agent, or by obtained by reacting a catalyst precursor comprising Mg, Cl, Ti, and OR groups that are in molar ratios defined by the formula $MgCl_n Ti_p(OR)_{(2-n)+4p}$ wherein n is from 0.3 to less than 1.7, p is lower than 0.6, the molar ratio (OR)/Cl is lower than 4 and R is selected from C1-C15 hydrocarbon groups with an organo-Al compound.

11. The catalyst precursor of claim 1 wherein p is 0.1 to 0.4.

12. A process for the preparation of a catalyst component for the polymerization of olefins, the process comprising:
reacting a catalyst precursor with an halogenating agent selected from halogenated organo-Al compounds and fully or partially halogenated compounds of transition metals belonging to one of the groups 4 to 6 of the Periodic Table of Elements,
the catalyst precursor comprising Mg, Cl, Ti, and OR groups that are in molar ratios defined by the formula $MgCl_n Ti_p(OR)_{(2-n)+4p}$ wherein n is from 0.3 to less than 1.7, p is lower than 0.45, the molar ratio (OR)/Cl is lower than 4 and R is selected from C1-C15 hydrocarbon groups.

13. The process of claim 12 wherein p ranges from 0.4 to 0.1, n ranges from 0.6 to 1.4, and the molar ratio (OR)/Cl ranges from 1.5 to 3.5.

* * * * *